United States Patent [19]
Gorder

[11] 3,858,023
[45] Dec. 31, 1974

[54] ELECTRODE HOLDER FOR ELECTRIC SOLDERING MACHINES

[76] Inventor: Clarence V. Gorder, 1537 Avenue D, Billings, Mont. 59102

[22] Filed: Aug. 16, 1973

[21] Appl. No.: 388,989

[52] U.S. Cl................ 219/85, 219/158, 269/254 R
[51] Int. Cl............................................. B23k 3/00
[58] Field of Search.............. 219/85, 86, 158, 159; 269/152, 154, 254 R

[56] References Cited
UNITED STATES PATENTS

| | | | |
|---|---|---|---|
| 1,131,726 | 3/1915 | Musher | 269/254 R X |
| 1,743,519 | 1/1930 | Bardet et al. | 219/85 |
| 2,025,917 | 12/1935 | Van Cleef | 219/85 |
| 2,915,616 | 12/1959 | Griffin | 219/159 X |
| 3,247,355 | 4/1966 | Olsen | 219/85 |

Primary Examiner—J. V. Truhe
Assistant Examiner—N. D. Herkamp
Attorney, Agent, or Firm—Douglas L. Carlsen; Andrew E. Carlsen

[57] ABSTRACT

An electrode holder for an electric soldering machine, said holder comprising an articulated arm having one end plugged into the machine to receive energy from the electrical circuit therein, and an electrode holding disk-shaped cartridge journaled at its center for rotational adjustment on the other end of the arm, the disk having clip means for holding a plurality of circumferentially spaced radially extending electrodes each extending beyond the periphery of the disk and carrying a premeasured quantity of solder on its outer end.

5 Claims, 6 Drawing Figures

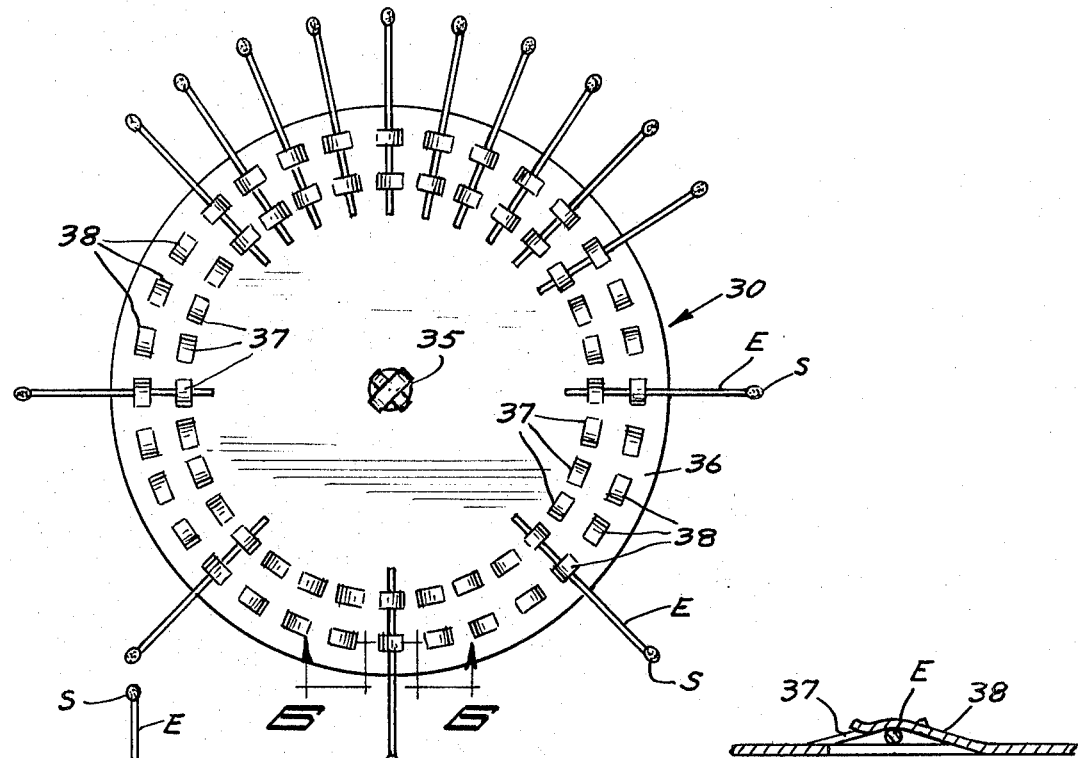
FIG. 4
FIG. 6
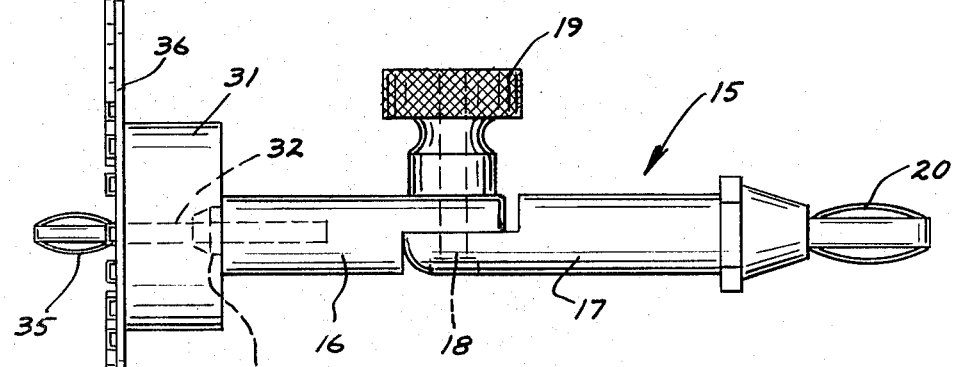
FIG. 5

ELECTRODE HOLDER FOR ELECTRIC SOLDERING MACHINES

BACKGROUND OF THE INVENTION

This invention relates generally to electric soldering machines and particularly to electrode holders used in conjunction with such machines.

Electric soldering machines are commonly used for relatively small but precise bonding operations such as in the forming of dental braces or other orthodontic devices. Such machines are provided with holders for holding electrodes each of which has a quantity of solder on the end thereof which is used in the soldering operation. The holders, however, generally hold only a single or a double electrode, thus necessitating frequent reloading or changing one electrode for another to get the proper quantity or type of solder or the like.

With minimal capacity, the frequent reloading or substitution of the electrode needed for an inappropriate one already in the machine causes office inefficiency due to the time involved. A major problem in providing an electrode cartridge which holds a great number and variety of electrodes has been in providing a combined holder and cartridge which is adapted to readily move each of the electrodes in the cartridge to and support it in the desired working position.

SUMMARY OF THE INVENTION

The primary object of the invention is to provide an electrode holder for an electric soldering machine which is adapted to hold a large number of soldering electrodes in such a manner that any one of them can be readily moved to and supported in an operative position.

Another object of the invention is to provide an electrode holder for holding a large number of electrodes which can be replaced after they have been expended.

Still another object of the invention is to provide an electrode holder for holding a large number of electrodes which can selectively utilize either a permanent or a disposable electrode holding cartridge.

With these and other objects in view the invention broadly comprises an electrode holder having an elongated support plugged into an electric soldering machine, the support including inner and outer arms which are pivotally interconnected for adjustment of the angle therebetween, and a disk-shaped cartridge journaled for rotation about its center on the outer end of the outer arm, said cartridge having circumferentially spaced clip means thereon for holding a large number of electrodes in radially extending positions relative to the center of the cartridge and having premeasured quantities of solder on their outer ends.

BRIEF DESCRIPTION OF THE DRAWINGS

In the drawings:

FIG. 4 is a plan view of the disposable type cartridge taken on line 4—4 of FIG. 1.

FIG. 5 is a side elevation of the form of the invention shown in FIG. 4.

FIG. 6 is an enlarged fragmentary section taken on line 6—6 of FIG. 4.

DESCRIPTION OF THE PREFERRED EMBODIMENT

Figure 1:
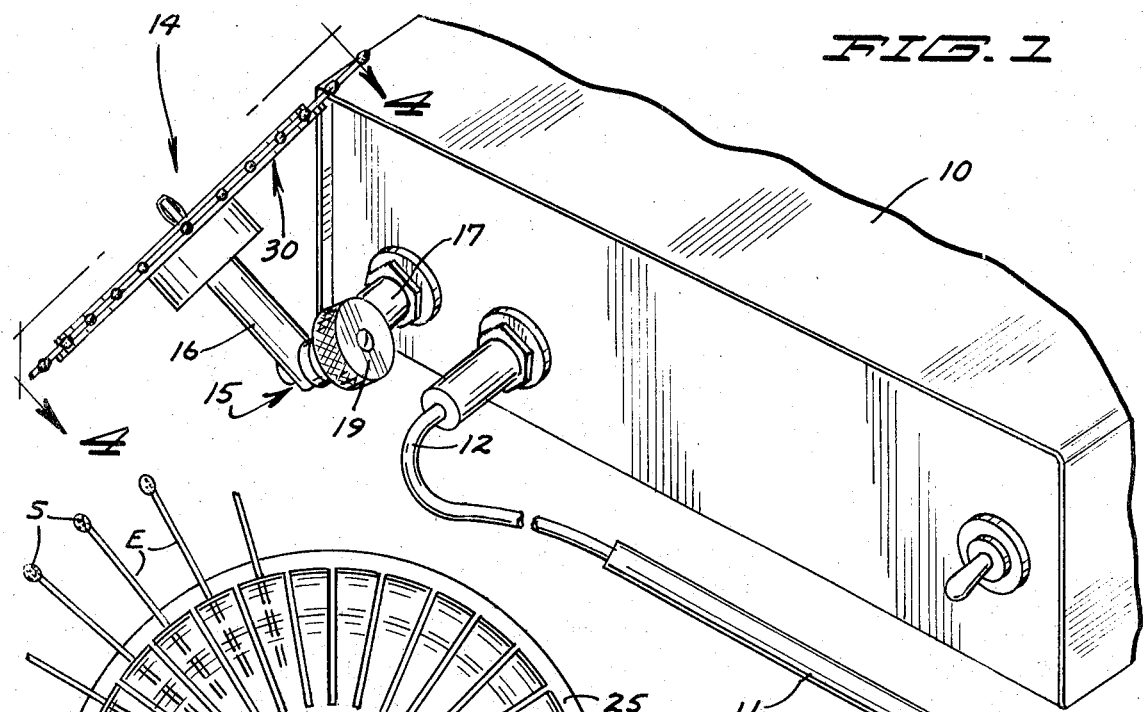
FIG. 1 is a perspective view of the front portion of a soldering machine with the holder support having a disposable type cartridge such as shown in FIGS. 4, 5 and 6 mounted thereon.

Referring now more particularly to the drawings reference numerals will be used to denote like parts or structural features in the different views. The welding machine is designated generally by the number 10 and includes a housing which encloses electrical components necessary for stepping up voltage from a suitable electric source connected to the machine.

The machine has an electrode 11 connected thereto by a flexible line and connector denoted generally at 12.

The electrode holder forming the subject matter of this invention is designated generally by the number 14. It includes an articulated support 15 having an outer arm 16 and an inner arm 17 which are pivotally interconnected by a bolt 18. A nut 19 is threaded on the end of bolt 18 and has a knurled surface for ease in manual loosening when it is desired to adjust the angle between arms 16 and 17. The end of inner arm 17 remote from bolt 18 is provided with a connector plug 20 commonly called a banana clip for frictionally retaining the support 15 in the machine. As thus far described the structure of the electrode holders shown in FIGS. 3 and 5 is identical.

Figure 2:
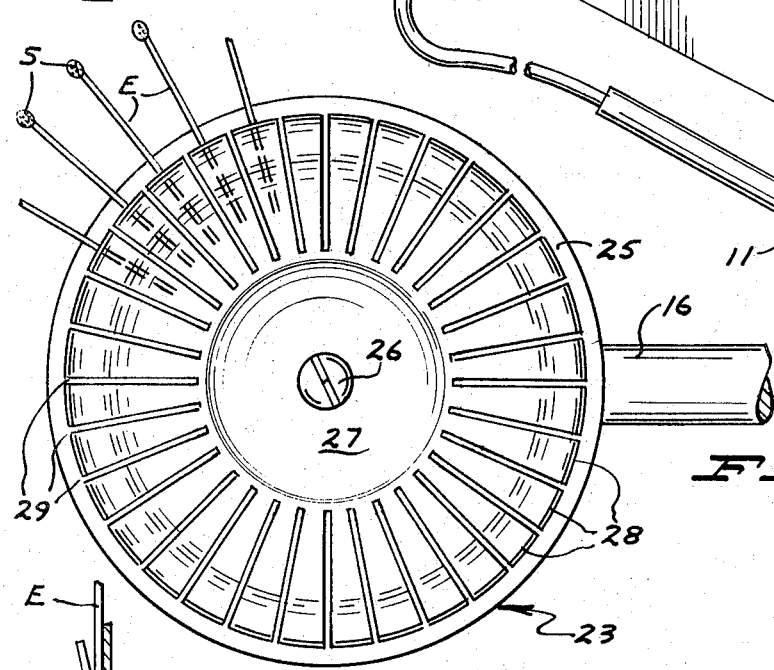
FIG. 2 is a plan view of a reloadable electrode holding cartridge.
Figure 3:
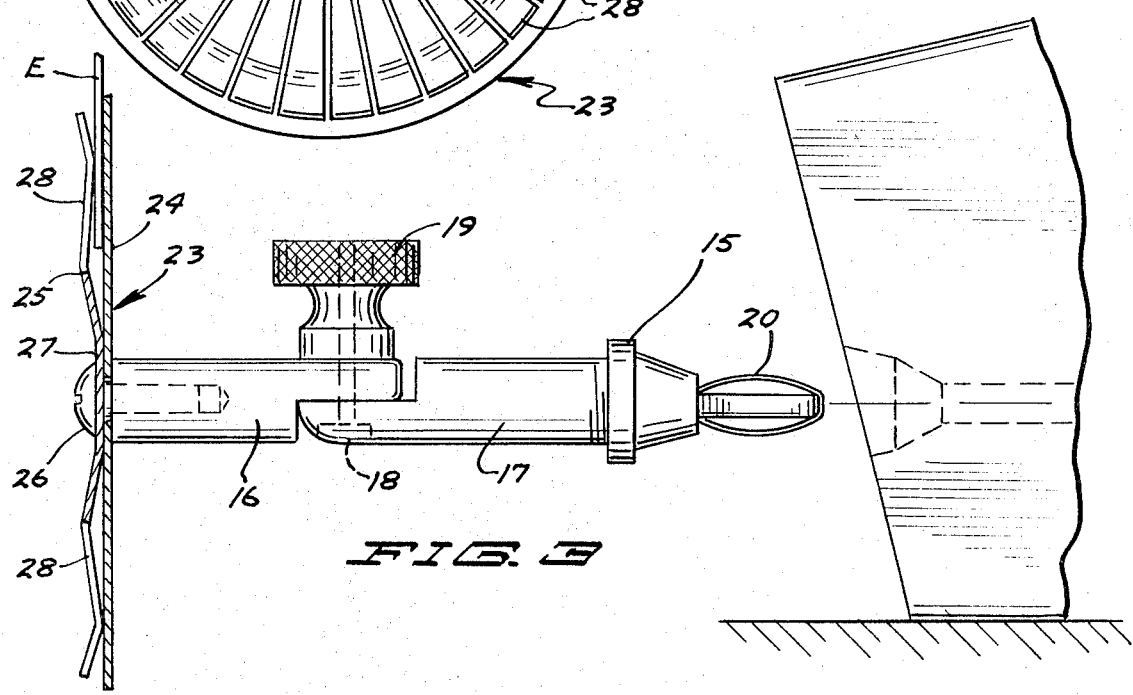
FIG. 3 is a side elevation of the holder incorporating the cartridge shown in FIG. 2 and detached from the machine.

Referring now particularly to FIGS. 2 and 3 the first form of the invention will be described in further detail. This is what might be referred to as the manual loaded or reusable electrode holder or cartridge 23. It includes inner and outer metal disks respectively designated at 24 and 25, each of which are provided with a central aperture. A screw 26 extends through the disk apertures and is threaded into an axial socket in arm 16 to secure the disks to the end thereof. The inner disk 24 is flat and is slightly greater in diameter than disk 25. Disk 25 has a flat central portion 27 surrounded by a plurality of radially extending fingers 28 separated by slots 29. Disk 25 is formed of a resilient material such as spring steel or beryllium copper and the fingers are formed in a broad Z shape, as shown in FIG. 3, with the outer portions thereof biased against the disk so that each finger 28 serves as a clip for holding an electrode E in radially extending position between the finger and disk 24. Each electrode E has a premeasured quantity of solder S attached to its outer end. These electrodes may be of various types for use in varied soldering operations.

In operation of cartridge 23 the orthodontic device to be worked on is suitably positioned and held adjacent to the holder 14. The desired electrode E is then brought into contact with the device by adjusting the outer arm 16 about the axis provided by the bolt 18 with the position of adjustment being secured by tightening the nut 19. Cartridge 23 is then rotated to bring the selected electrode E into the proper position and electrode 11 is brought into contact therewith to melt the solder and control its flow to provide the desired bond.

It will be readily understood that the cartridge 23 is of the permanent type and that as the various electrodes E are used up, they may be replaced by removal and insertion of a new electrode under the same finger 28.

A second form of the invention is shown in FIGS. 1 and 4 through 6. This is a disposable cartridge designated generally by the numeral 30. In this type of holder an outwardly opening cartridge support cup 31 is secured to the outer end of the outer arm 16 by means of a bolt 32 which extends through the cup and is threaded into the socket in the end of arm 16. A nut 34 positioned medially on the bolt secures the cup 31 against the end of the outer arm. The distal or extended end of the bolt 32 has a connector plug 35 mounted thereon which is comparable to the plug 20.

The cartridge 30 is formed of a single sheet of metal such as beryllium copper. It is a flat disk 36 with a center aperture adapted to frictionally seat the plug 35 to provide a releasable connection therewith. The disk 36 is provided with concentric annular rows of spring clips which are punched from the disk sheet (see FIG. 6). The clips in the inner and outer rows are respectively denoted at 37 and 38 and each clip 37 is radially aligned with a clip 38 whereby each pair is adapted to jointly support an electrode E having a quantity of solder S on its outer end. As in the first embodiment the electrodes extend radially.

The cartridge 30 is used in the same manner as the first embodiment. However, it will be understood that this design is less durable than cartridge 23 and is designed for disposal after the electrodes have been used rather than reloading.

It will be understood that with all of the components being metal adapted to conduct electricity that current will travel through the support 15, cartridge 23 or 30 and electrode E during the soldering operation with the circuit being completed when the tip of electrode 11 is brought into contact with the selected electrode E.

While the circular shape is found to be the most desirable for the cartridges, it will be understood that square, hexagonal or other symmetrical configurations could be used.

The disclosed construction accordingly provides an electrode holder for an electric soldering machine which economically and effectively carries out the aforementioned objectives.

Having now therefore fully illustrated and described my invention, what I claim to be new and desire to protect by United States Letters Patent is:

1. In an electrode holder for use with an electric soldering machine,
   a. an elongated metal support having a plug at one end adapted to be coupled with the electric current of the machine, said support having inner and outer arms arranged end to end and pivotally interconnected at their adjacent ends for adjusting the angle between the arms,
   b. a flat symmetrically shaped metal cartridge journaled for rotation about its center on the end of the outer arm, said cartridge having a plurality of clip means spaced around the marginal portion thereof.

2. The subject matter of claim 1 wherein said cartridge has a circular shape.

3. The subject matter of claim 1 wherein said cartridge is formed of a pair of plates secured together at their centers, one of said plates being flat and the other having a plurality of fingers extending in radially outward directions from the axis of the cartridge rotation, each of said fingers configured to have an outer end portion in yieldable pressure engagement with the flat plate to form one of said clip means.

4. The subject matter of claim 2 wherein said cartridge is formed of a flat metal plate having two concentric annular rows of spring clips punched therefrom with a clip in each row radially aligned with a clip in the other row to provide said clip means.

5. The subject matter of claim 1 wherein said cartridge is provided with a central aperture and the outer end of the outer arm is provided with a friction type connector plug which is seated in said aperture to form a readily releasable journal connection between the cartridge and arm.

* * * * *